(12) United States Patent
Hodges et al.

(10) Patent No.: US 8,068,433 B2
(45) Date of Patent: Nov. 29, 2011

(54) LOW POWER OPERATION OF NETWORKED DEVICES

(75) Inventors: Stephen E. Hodges, Cambridge (GB);
Yuvraj Agarwal, San Diego, CA (US);
James W. Scott, Cambridge (GB);
Ranveer Chandra, Kirkland, WA (US);
Paramvir Bahl, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 11/945,104

(22) Filed: Nov. 26, 2007

(65) Prior Publication Data

US 2009/0135751 A1 May 28, 2009

(51) Int. Cl.
*G08C 17/00* (2006.01)
*H04L 12/28* (2006.01)
*H04L 29/00* (2006.01)

(52) U.S. Cl. .................. 370/245; 370/216; 370/311

(58) Field of Classification Search .................. None
See application file for complete search history.

(56) References Cited

U.S. PATENT DOCUMENTS

| | | | |
|---|---|---|---|
| 5,469,553 A | 11/1995 | Patrick | |
| 6,925,529 B2 | 8/2005 | Bohrer et al. | |
| 7,032,119 B2 | 4/2006 | Fung | |
| 7,035,972 B2 | 4/2006 | Guha et al. | |
| 7,043,650 B2 | 5/2006 | Bresniker et al. | |
| 7,092,943 B2 | 8/2006 | Roese et al. | |
| 7,093,149 B2 | 8/2006 | Tsirkel et al. | |
| 7,600,137 B2 | 10/2009 | Trappeniers et al. | |
| 7,673,161 B2 | 3/2010 | Freeman et al. | |
| 2002/0167952 A1* | 11/2002 | Watson et al. ............... 370/401 |
| 2002/0177449 A1 | 11/2002 | McDonnell et al. | |
| 2003/0217299 A1 | 11/2003 | Neuman et al. | |
| 2004/0107273 A1 | 6/2004 | Biran et al. | |
| 2004/0230848 A1 | 11/2004 | Mayo et al. | |
| 2005/0044436 A1 | 2/2005 | Holle | |
| 2005/0204027 A1* | 9/2005 | Claseman ................... 709/223 |
| 2006/0171329 A1* | 8/2006 | Ying .......................... 370/254 |
| 2006/0251115 A1* | 11/2006 | Haque et al. ............... 370/466 |
| 2007/0006174 A1 | 1/2007 | Sohm et al. | |
| 2007/0011472 A1 | 1/2007 | Cheng | |
| 2007/0022121 A1 | 1/2007 | Bahar et al. | |
| 2007/0079063 A1 | 4/2007 | Mizuno | |
| 2007/0136489 A1* | 6/2007 | Temoshenko et al. ....... 709/237 |
| 2007/0150713 A1* | 6/2007 | Almeida et al. ............... 713/1 |
| 2007/0162582 A1 | 7/2007 | Belali et al. | |

(Continued)

OTHER PUBLICATIONS

Agarwal et al., "Somniloquy: Maintaining Network Connectivity While Your Computer Sleeps", Mircosoft Research MSR-TR-2008-42, Mar. 2008 pp. 1-pp. 14.

(Continued)

*Primary Examiner* — Chi Pham
*Assistant Examiner* — Soon-Dong Hyun
(74) *Attorney, Agent, or Firm* — Lee & Hayes, PLLC (57) ABSTRACT

Methods of reducing power consumption of networked devices are described. When a main processor and associated hardware in a computing device is powered down, a processing element, with lower power consumption than the main processor, performs networking functions on behalf of the main processor. The processing element monitors events and wakes the main processor when defined criteria are satisfied. In an embodiment, these network functions may be to maintain existing network connections and/or establish new network connections and the defined criteria may relate to messages received by the device which are analyzed by the processing element running the application layer code and these criteria may be configurable by a user of the device.

19 Claims, 8 Drawing Sheets

U.S. PATENT DOCUMENTS

| | | | |
|---|---|---|---|
| 2008/0276016 | A1 | 11/2008 | Fujibayashi |
| 2008/0276042 | A1 | 11/2008 | Hetzler et al. |
| 2009/0063878 | A1 | 3/2009 | Schmidt et al. |
| 2009/0249001 | A1 | 10/2009 | Narayanan et al. |
| 2010/0023788 | A1 | 1/2010 | Scott et al. |
| 2010/0036834 | A1 | 2/2010 | Bandas |
| 2010/0106903 | A1 | 4/2010 | Fujibayashi et al. |
| 2010/0169678 | A1 | 7/2010 | Kozuka |
| 2010/0257142 | A1 | 10/2010 | Murphy et al. |

OTHER PUBLICATIONS

PCT International Search Report dated Mar. 13, 2009 from corresponding PCT Application No. PCT/US2008/076536 filed Sep. 16, 2008, 3 pages.

"Active Notifications White Paper", Microsoft Corporation, Nov. 2006, pp. 16.

Agarwal, et al., "Dynamic Power Management using On Demand Paging for Networked Embedded Systems", IEEE, 2005, pp. 755-759.

Agarwal, et al., "On Demand Paging Using Bluetooth Radios on 802.11 Based Networks", CECS, Jul. 2003, pp. 19.

Agarwal, et al., "Wireless Wakeups Revisited: Energy Management for VoIP over Wi-Fi Smartphones", ACM, 2007, pp. 14.

"Autonomous Mode Operation for Marvell USB 8388", retrieved on Sep. 27, 2007, at <<http://dev.laptop.org/ticket/1060.>>, pp. 5.

Bahl, et al., "Wake on Wireless—a Case for Multi Radio Wireless LAN", Apr. 4, 2002, pp. 47.

"Cell2Notify: Caller ID Based Notifications on Smartphones", at <<http://research.microsoft.com/netres/projects/cell2notify/>>, Microsoft Corporation, 2007, pp. 1.

"Intel Centrino Mobile Technology Wake on Wireless LAN (WoWLAN) Feature", Intel Corporation, 2006, pp. 6.

Kumar, et al., "Single—ISA Heterogeneous Multi-Core Architectures: The Potential for Processor Power Reduction", Proceedings of the 36th International Symposium on Microarchitecture, Dec. 2003, pp. 12.

Mayo, et al., "Energy Consumption in Mobile Devices: Why Future Systems Need Requirements—Aware Energy Scale—Down", Hewlett-Packard Company, 2003, pp. 10.

Mishra, et al., "Wake-on-WLAN", ACM, 2006, pp. 9.

Olsen, et al., "Multi-Processor Computer System Having Low Power Consumption", Springer-Verlag Berlin Heidelberg, 2003, pp. 53-67.

Pering, et al., "CoolSpots: Reducing the Power Consumption of Wireless Mobile Devices with Multiple Radio Interfaces", ACM, 2006, pp. 220-232.

Pering, et al., "Exploiting Radio Hierarchies for Power-Efficient Wireless Device Discovery and Connection Setup", IEEE, 2005, pp. 6.

"Physically Connecting to a Network or Broadband Modem", at <<http://support.dell.com/support/edocs/system/latd820/en/ug/network.htl>, Dell, 2007, pp. 12.

Shih, et al., "Wake on Wireless: An Event Driven Energy Saving Strategy for Battery Operated Devices", ACM, 2002, pp. 12.

Sorber, et al., "Turducken: Hierarchical Power Management for Mobile Device", pp. 14.

"Toshiba Leading Innovation", at <<http://www.toshibadirect.com/td/b2c/ebtext.to?page=r400_micro_f>>, 2007, pp. 2.

U.S. Appl. No. 11/945,104, filed Nov. 26, 2007, Stephen Hodges, Yuvraj Agarwal, Paramvir Bahl, Ranveer Chandra, Scott James, "Low-Power Operation of Networked Devices," 45 pages.

U.S. Appl. No. 12/059,695, filed Mar. 31, 2008, Dushyanth Narayanan, Austin Donnelly, Sameh Elnikety, Antony Rowstron, Eno Thereska, "Storage Systems Using Write Off-Loading," 58 pages.

U.S. Appl. No. 12/714,223, filed Feb. 26, 2010, Eno Thereska, Austin Donnelly, Dushyanth Naraynanan, "Reducing Power Consumption of Distributed Storage Systems," 58 pages.

Abd-El-Malek et al., "Ursa Minor versatile cluster-based storage," retrieved on Dec. 30, 2009 at <<http://www.pdl.cmu.edu/PDL-FTP/SelfStar/ursaminor-fast05.pdf>>, USENIX Association, Proceedings of Conference on File and Storage Technology (FAST), Dec. 13, 2005, pp. 1-14.

"Advanced Power Management," COPAN Systems, 2007, retrieved at <<http://www.copansystems.com/products/power_managed_raid.php>>, pp. 1-2.

Agarwal et al., "Somniloquy: Augmenting Network Interfaces to Reduce PC Energy Usage," retrieved on Nov. 22, 2010 at <<http://research.microsoft.com/pubs/79419/agarwal-NSDI09-Somniloquy.pdf>>, USENIX Association, Proceedings of Symposium on Networked Systems Design and Implementation (NSDI), Boston, Massachusetts, Apr. 2009, pp. 365-380.

Allman et al., "Enabling an Energy-Efficient Future Internet Through Selectively Connected End Systems," ACM SIGCOMM HotNets, 2007, pp. 1-7.

Anand et al., "SelfTuning Wireless Network Power Management," ACM MobiCom 2003 (1581137532/03/0009), 2003, pp. 176-189.

Anderson et al., "Serverless Network File Systems," ACM, 1995, pp. 1-21.

Aranya et al., "Tracefs A File System to Trace Them All," In Proc. USENIX Conference on File and Storage Technologies (FAST 2004), 2004, pp. 15.

Baker et al., "Measurements of a Distributed File System," ACM, 1991, pp. 198-212.

Baker et al., "Non-Volatile Memory for Fast, Reliable File Systems," In Proc. International Conference on Architectural Support for Programming Languages and Operating Systems (ASPLOS 1992), pp. 1-13.

Barroso et al, "The Case for Energy-Proportional Computing," retrieved on Dec. 30, 2009 at <<http://www.cra.org/ccc/docs/ieee_computer07.pdf>>, IEEE Computer Society Press, vol. 40, No. 12, Dec. 2007, pp. 33-37.

Battles et al., "Reducing Data center Power Consumption through Efficient Storage," retrieved at <<http://www.netapp.com/ftp/wp-reducing-datacenter-power-consumption.pdf>> Feb. 2007, pp. 8.

Benini et al., "A Survey of Design Techniques for System-Level Dynamic Power Management," IEEE VLSI Transactions (1063 8210/00), vol. 8, No. 3, 2000, pp. 299-316.

Borisov et al., "Generic Application-Level Protocol Analyzer and its Language," Microsoft Research, MSR-TR-2005-133, 2005, pp. 1-15.

Carrera et al., "Conserving Disk energy in network servers," ACM, 2003, pp. 12.

Chase et al., "Managing energy and server resources in hosting centers," Department of Computer Science, Proceedings of the eighteenth ACM symposium on Operating systems principles, New York, NY, 2001, pp. 14.

"Cheetah 10K.7," Seagate Technology LLC, 2004, pp. 2.

Christensen et al., "The next frontier for communications networks: Power management," Computer Communications, vol. 27, No. 18, 2004, pp. 1758-1770.

Colarelli et al.,"Massive Arrays of Idle Disks for Storage Archives," IEEE, 2002, pp. 11.

Dahlin et al.,"Cooperative Caching: Using Remote Client Memory to Improve File System Performance," In Proc. Symposium on Operating Systems Design and Implementation (OSDI 1994), pp. 14.

DataDirect Networks, generated Jan. 11, 2008, <<http://www.datadirectnet.com>>, pp. 3.

DeCandia et al., "Dynamo: Amazon's Highly Available Key-value Store," retrieved on Dec. 30, 2009 at <<http://s3.amazonaws.com/AllThingsDistributed/sosp/amazon-dynamo-sosp2007.pdf>>, ACM SIGOPS Operating Systems Review (SOSP), vol. 41, No. 6, 2007, pp. 205-220.

Decker, "Requirements for a Location-Based Access Control Model," retrieved on Aug. 26, 2010 at <<http://delivery.acm.org/10.1145/1500000/1497259/p346-decker.pdf?key1=1497259&key2=2653182821&coll=GUIDE&dl=GUIDE&CFID=101946902& CFTOKEN=51824440>>, ACM, Proceedings of Intl Conference on Advances in Mobile Computing and Multimedia (MoMM), Linz, Austria, Nov. 2008, pp. 346-349.

Douglis et al., "Thwarting the Power-Hungry Disk," USENIX Winter Technical Conference, 1994, pp. 292-306.

"Dropbox—Online backup, file sync, and sharing made easy," retrieved on Apr. 4, 2011 at <<https://www.dropbox.com>>, Dropbox, 2011, pp. 1.

Flautner, "Automatic Performance Setting for Dynamic Voltage Scaling," MobiCom 2001, 2001, pp. 260-271.

Flinn et al., "Managing Battery Lifetime with Energy-Aware Adaptation," ACM Transactions on Computer Systems, vol. 22, No. 2, 2004, pp. 137-179.

Ganesh et al., "Optimizing Power Consumption in Large Scale Storage Systems," Proceedings of the 11th USENIX workshop on Hot topics in operating systems, Berkeley, CA, 2007, retrieved at <<http://www.cs.cornell.edu/projects/quicksilver/public_pdfs/lfs07.pdf>>, pp. 6.

Gashti et al., "An UpnP-based context-aware framework for ubiquitous mesh home networks," retrieved on Nov. 22, 2010 at <<http://ieeexplore.ieee.org/stamp/stamp.jsp?arnumber=05449966>>, IEEE Intl Symposium on Personal, Indoor and Mobile Radio Communications (PIMRC), Tokyo, Japan, Sep. 2009, pp. 400-404.

Ghemawat et al., "The Google File System," retrieved on Dec. 30, 2009 at <<http://labs.google.com/papers/gfs-sosp2003.pdf>>, ACM SIGOPS Operating Systems Review (SOSP), vol. 37, No. 5, Oct. 19, 2003, pp. 29-43.

Gibson et al., "A Cost-Effective, High-Bandwidth Storage Architecture," retrieved on Nov. 22, 2010 at <<http://www.pdl.cmu.edu/ftp/NASD/asplos98.pdf>>, ACM, Proceedings of Conference on Architectural Support for Programming Languages and Operating Systems (ASPLOS), San Jose, California, Oct. 1998, pp. 92-103.

Gobioff, "Security for a High Performance Commodity Storage Subsystem," retrieved on Aug. 26, 2010 at <<http://www.pdl.cmu.edu/PDL-FTP/NASD/hbg_thesis.pdf>>, Carnegie Mellon University. School of Computer Science, Doctoral Thesis, Jul. 1999, pp. 1-222.

Gunaratne et al., "Managing energy consumption costs in desktop PCs and LAN switches with proxying, split TCP connections, and scaling of link speed," John Wiley & Sons, Ltd.: International Journal of Network Management, vol. 15, No. 5, 2005, pp. 297-310.

Gupta et al., "Greening of the internet," ACM SIGCOMM 2003 (1-58113-735-4/03/0008), 2003, pp. 19-26.

Gurumurthi et al., "DRPM Dynamic Speed Control for Power Management in Server Class Disks," In Proc. International Symposium on Computer Architecture (ISCA 2003), San Diego, pp. 11.

Gurumurthi et al., "Interplay of Energy and Performance for Disk Arrays Running Transaction Processing Workloads," IBM Research Division, IEEE International Symmposium on Performance Analysis of Systems and Software, 2003, pp. 10.

Hamilton, "Resource Consumption Shaping," retrieved on Dec. 31, 2009 at <<http://perspectives.mvdirona.com/2008/12/17/ResourceConsumptionShaping.aspx>>, Dec. 17, 2008, pp. 1-5.

Huang et al., "Design and Implementation of Power-Aware Virtual Memory," USENIX Annual Technical Conference, 2003, pp. 57-70.

Hunt et al., "Detours: Binary Interception of Win32 Functions," retrieved on Nov. 22, 2010 at <<http://research.microsoft.com/pubs/68568/huntusenixnt99.pdf>>, Usenix Association, Proceedings of Windows NT Symposium (WINSYM). Seattle, Washington, vol. 3, Jul. 1999, pp. 1-9.

"Industry Report—Digital Lifestyles: 2010 Outlook," retrieved on Apr. 4, 2011 at <<http://www.parksassociates.com/report/digital-lifestyles-2010-outlook>>, Parks Associates, 2010, pp. 1-2.

"Industry Report—Home Networks for Consumer Electronics," retrieved on Apr. 4, 2011 at http://www.parksassociates.com/report/home-networks-for-consumer-electronics>>, Parks Associates, 2009, pp. 1-4.

"Intel Corporation, Dual-Core Intel R Xeon R Processor," Intel Corporation, 2004-2006, pp. 104.

Jiang et al., "Enabling Autonomic Power-Aware Management of Instrumented Data Centers," retrieved on Dec. 30, 2009 at <<http://ieeexplore.ieee.org/stamp/stamp.jsp?arnumber=05160976>>, IEEE Computer Society, Proceedings of Symposium on Parallel and Distributed Processing (IPDPS), 2009, pp. 1-8.

Joukov et al.,"Accurate and Efficient Replaying of File System Traces," In Proc. USENIX Conference on File and Storage Technologies (FAST 2005), 2005, pp. 14.

Kim et al., "Power Management in Disk Storage System with Multiple RPM Levels," ACEED, Mar. 1, 2005, pp. 1.

Kistler et al., "Disconnected Operation in the Coda File Sysem," retrieved on Nov. 22, 2010 at <<http://www.cs.cmu.edu/~coda/docdir/s13.pdf>>, ACM Transactions on Computer Systems, vol. 10, No. 1, Feb. 1992, pp. 3-25.

Kotsovinos et al., "replic8: Location-aware data replication for high availability in ubiquitous environments," retrieved on Aug. 26, 2010 at <<http://www.kotsovinos.com/research/papers/replic8.pdf, Springer-Verlag Berlin, LNCS vol. 3510, Proceedings of Intl Conference on Wired/Wireless Internet Communications (WWIC), Xanthi, Greece, May 2005, pp. 32-41.

Kravets et al., "Application-Driven Power Management for Mobile Communication," Wireless Networks, vol. 6, No. 4, 2000, pp. 263-277.

Krishnan et al., "Thwarting the power-hungry disk," USENIX Winter, 1994, pp. 15.

Li et al., "EERAID Energy Efficient Redundant and Inexpensive Disk Arrays," ACM, 2004, pp. 1-14.

"Managing Enterprise Storage," retrieved on Jan. 11, 200 at <<http://www.informationweek.com/news/showArticle.jhtml?articleID=202404374>>, pp. 1-4.

Mazurek et al., "Access Control for Home Data Sharing: Attitudes, Needs and Practices," retrieved on Nov. 22, 2010 at <<http://lorrie.cranor.org/pubs/chi2010-access-control.pdf>>, ACM, Proceedings of Intl Conference on Human Factors in Computing Systems (CHI), Atlanta, Georgia, Apr. 2010, pp. 645-654.

Microsoft. Event tracing, <<http://msdn.microsoft.com/en-gb/library/bb968803(VS.85).aspx>> retrieved from the internet on Aug. 12, 2008, 1 page.

Mogul, "TCP offload is a dumb idea whose time has come," IEEE HotOS, vol. 9, 2003, pp. 25-30.

"NAND Flash-Based Solid State Disk," Samsung Electronics, 2007, pp. 1-62.

Narayanan et al., "Everest: Scaling down peak loads through I/O off-loading," retrieved on Dec. 30, 2009 at <<http://research.microsoft.com/pubs/68163/Everest-OSDI08.pdf>>, USENIX Association, Proceedings of OSDI, Dec. 2008, pp. 1-14.

Narayanan et al., "Write Off-Loading Practical Power Management for Enterprise Storage," ACM Transactions on Storage (TOS), vol. 4 Issue 3, Nov. 2008, New York, NY, pp. 15.

News release, Jun. 25, 2007, <<http://www.hp.com/hpinfo/newsroom/press/2007/070625xa.html, pp. 1-3.

Nightingale et al., "Energy-efficiency and storage flexibility in the blue file system," Proceedings of the 6th conference on Symposium on Operating Systems Design & Implementation—vol. 6, Berkeley, CA, 2004, pp. 16.

Ellard et al., "Passive NFS Tracing of Email and Research Workloads," In Proc. USENIX Conference on File and Storage Technologies (FAST 2003), 2003, pp. 23.

Pinheiro et al., "Energy Conservation Techniques for Disk Array-Based Servers," ACM, 2004, pp. 11.

Pinheiro et al., "Failure Trends in a Large Disk Drive Population," In Proc. USENIX Conference on File and Storage Technologies (FAST2007), pp. 13.

Ramasubramanian et al., "Cimbiosys: A Platform for Content-Based Partial Replication," retrieved on Nov. 22, 2010 at <<http://research.microsoft.com/pubs/56258/tr-2008-116.pdf>>, USENIX Association, Proceedings of Symposium on Networked Systems Design and Implementation (NSDI), Boston, Massachusetts, Apr. 2009, pp. 261-276.

Ray et al., "A Spatio-Temporal Role-Based Access Control Model," retrieved on Aug. 26, 2010 at <<http://citeseerx.ist.psu.edu/viewdoc/download?doi=10.1.1.160.3506&rep=rep1&type=pdf>>, Springer-Verlag Berlin, Proceedings of Conference on Data and Applications Security, Redondo Beach, California, 2007, pp. 211-226.

Yao et al., "RIMAC A Novel Redundancy Based Hierarchical Cache Architecture for Energy Efficient, High Performance Storage Systems," ACM, 2006, pp. 14.

Rodden et al., "Best of Both Worlds: Improving Gmail Labels with the Affordances of Folders," retrieved on Nov. 22, 2010 at <<http://static.googleusercontent.com/external_content/untrusted_dlcp/www.google.com/en/us/research/pubs/archive/36334.pdf>>, ACM, Proceedings of Intl Conference on Human Factors in Computing Systems (CHI), Atlanta, Georgia, Apr. 2010, pp. 4587-4596.

Rosenblum et al., "The Design and Implementation of a Log-Structured File System," ACM, 1992, pp. 1-15.

Ruemmler et al., "UNIX Disk Access Patterns," In Proc. USENIX Winter 1993 Technical Conference, pp. 17.

Sabhanatarajan et al., "Smart-NICs: Power Proxying for Reduced Power Consumption in Network Edge Devices," IEEE ISVLSI 2008, 2008, pp. 75-80.

Saito et al., "FAB: Building Distributed Enterprise Disk Arrays from Commodity Components," retrieved on Dec. 30, 2009 at <<http://www.hpl.hp.com/research/ssp/papers/2004-10-ASPLOS-FAB.pdf>>, ACM SIGARCH Computer Architecture News (ASPLOS Conference), vol. 32, No. 5, Dec. 2004, pp. 48-58.

Salmon et al., "Perspective: Semantic data management for the home," retrieved on Nov. 22, 2010 at <<http://www.pdl.cmu.edu/PDL-FTP/Storage/salmon-fast09.pdf>>, USENIX Association, Proceedings of Conference on File and Storage Technologies (FAST), San Francisco, California, Feb. 2009, pp. 167-182.

"SanDisk SSD UATA 5000 1.8," SanDisk Corporation, 2007, pp. 35.

Schneider, "Implementing Fault-Tolerant Services Using the State Machine Approach: A Tutorial," retrieved on Dec. 30, 2009 at <<http://www.cs.cornell.edu./fbs/publications/SMSurvey.pdf>>, ACM Computing Surveys (CSUR), vol. 2, No. 4, Dec. 1990, pp. 299-319.

Schroeder et al.,"Disk Failures in the Real World: What Does an MTTF of 1,000,000 Hours Mean to You?" In Proc. USENIX Conference on File and Storage Technologies (FAST2007), pp. 17.

Seltzer et al., "An Implementation of a Log-Structured File System for UNIX," In Proc. USENIX Winter 1993 Conference, pp. 20.

Seltzer et al., "Hierarchical File Systems are Dead," retrieved on Nov. 22, 2010 at <<http://www.usenix.org/event/hotos09/tech/full_papers/seltzer/seltzer.pdf>>, USENIX Association, Proceedings of Conference on Hot Topics in Operating Systems (HotOS), Monte Verita, Switzerland, May 2009, pp. 1-5.

Simunic et al., "Dynamic Power Management for Portable Systems," ACM MobiCom 2000, 2000, pp. 11-19.

"SNIA IOTTA Repository," retrieved on Dec. 31, 2009 at <<http://iotta.snia.org/>>, Storage Networking Industry Association, 2008, pp. 1-3.

Sobti et al., "Segank: A Distributed Mobile Storage System," retrieved on Nov. 2, 2010 at <<http://www.cs.princeton.edu/~rywang/papers/fast04/segank.pdf>>, USENIX Association, Proceedings of Conference on File and Storage Technologies (FAST), San Francisco, California, 2004, pp. 239-252.

Strauss et al., "Device Transparency: a New Model for Mobile Storage," retrieved on Nov. 22, 2010 at <<http://pdos.csail.mit.edu/papers/eyo-hotstorage09.pdf>>, ACM SIGOPS Operating Systems Review, vol. 44, No. 1, Jan. 2010, pp. 5-9.

Stuedi et al., "WhereStore: Location-based Data Storage for Mobile Devices Interacting with the Cloud," retrieved on Aug. 26, 2010 at <<http://delivery.acm.org/10.1145/1820000/1810932/a1-stuedi.pdf?key1=1810932&key2=9748082821&coll=GUIDE&dl=GUIDE&CFID=101936225&CFTOKEN=37599229>>, ACM, Proceedings of Workshop on Mobile Cloud Computing and Services: Social Networks and Beyond (MCS), San Francisco, California, Jun. 2010, pp. 1-8.

"TCP Offload Engine," retrieved on Mar. 7, 2008 at <<http://en.wikipedia.org/wiki/TCP_Offload_Engine>>, Wikipedia, 2008, pp. 1-5.

Terry et al., "Managing Update Conflicts in Bayou, a Weakly Connected Replicated Storage System," retrieved on Nov. 22, 2010 at <<http://citeseerx.ist.psu.edu/viewdoc/download;jsessionid=C655550F24E44FE98C6D7041A8AD77CA?doi=10.1.1.12.7323&rep=rep1&type=pdf>>, ACM, Proceedings of Symposium on Operating Systems Principles (SOSP), Copper Mountain Resort, Colorado, Dec. 1995, pp. 172-183.

Thereska et al., "Sierra: a power-proportional, distributed storage system," retrieved on Feb. 24, 2010 at <<http://research.microsoft.com/pubs/112503/sierra-TR.pdf>>, Microsoft Corporation, Microsoft Tech Report MSR-TR-2009-153, Nov. 2009, pp. 1-15.

van Renesse et al., "Chain Replication for Supporting High Throughput and Availability," retrieved on Dec. 30, 2009 at <<http://www.cs.cornell.edu/home/rvr/papers/osdiO4.pdf>>, USENIX Association, Proceedings of Conference on Symposium on Operating Systems Design and Implementation (OSDI), vol. 4, 2004, pp. 91-104.

Wachs et al., "Argon: performance insulation for shared storage servers," retrieved on Dec. 30, 2009 at <<http://www.pdl.cmu.edu/PDL-FTP/Storage/argon-fast07.pdf, USENIX Association, Conference on File and Storage Technologies (FAST), Supercedes Carnegie Mellon University Parallel Data Lab Technical Report CMU-PDL-06-106 (May 2006), Feb. 13, 2007, pp. 1-16.

Wang et al., "LOCK: A Highly Accurate, Easy-to-Use Location-based Access Control System," retrieved on Aug. 26, 2010 at <<http://itcs.tsinghua.edu.cn/~yongcai/data/LOCK_of_LoCA09.pdf>>, Springer-Verlag Berlin, LNCS vol. 5561, Proceedings of Location and Context Awareness (LoCA), Tokyo Japan, 2009, pp. 254-270.

Weddle et al., "PARAID The Gearshifting Power-Aware RAID," In Proc. USENIX Conference on File and Storage Technologies (FAST 2007), 2007, pp. 16.

Whitehead, "Welcome to WebDAV Resources," retrieved on Apr. 4, 2011 at <<http://www.webdav.org>>, Apr. 2010, pp. 1-4.

"Windows Azure Platform," retrieved on Dec. 31, 2009 at <<http://www.microsoft.com/windowsazure/>>, 2009, pp. 1-2.

"Windows live sync," retrieved on Apr. 4, 2011 at <<http://sync.live.com>>, Microsoft Corporation, 2011, pp. 1.

Yang et al., "On Effective Offloading Services for Resource-Constrained Mobile Devices Running Heavier Mobile Internet Applications," retrieved on Nov. 22, 2010 at <<http://awin.cs.ccu.edu.tw/magazine/IEEE_com/2008/002.pdf>>, IEEE Communications Magazine, Jan. 2008, pp. 56-61.

Zedlewski et al., "Modeling harddisk power consumption," <<http://www.cs.princeton.edu/~rywang/papers/fast03/dempsey.pdf>>, 2003, pp. 14.

Zhu et al.,"Hibernator: Helping Disk Arrays Sleep Through the Winter," ACM, 2005, pp. 14.

Zhu et al., "Power-Aware Storage Cache Management". IEEE, retrieved at <<http://opera.ucsd.edu/paper/TC05.pdf>>, 2005, pp. 35.

Zhu et al. "Power-Aware Storage Cache Management", retrieved on Dec. 30, 2009 at <<http://ieeexplore.ieee.org/stamp/stamp.jsp?arnumber=01407848>>, IEEE Computer Society, Transactions on Computers, vol. 54, No. 5, May 2005, pp. 587-602.

Zhu et al., "TBBT Scalable and Accurate Trace Replay for File Server Evaluation". ACM, 2005, pp. 2.

* cited by examiner

LOW POWER OPERATION OF NETWORKED DEVICES

BACKGROUND

Many computing devices are battery powered and for these devices it is beneficial to reduce their overall power consumption. Reduced power consumption enables increased battery life or alternatively the size, weight and cost of the battery can be reduced. It is also beneficial to reduce the power consumption of mains powered devices (i.e. non-battery powered devices) for environmental reasons and reduce operating cost.

One approach to minimizing the power of computing devices is to shut down or suspend the device, and/or to switch off associated devices, such as a display, when the device is not in use. The device may subsequently be woken up by the user through user input (e.g. by hitting the space bar or pressing the power button). Another approach is to provide a reduced power mode which is used whenever the device is not connected to mains electricity, e.g. by reducing the brightness of the display or running the CPU more slowly.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of reducing power consumption of networked devices are described. When a main processor and associated hardware in a computing device is powered down, a processing element, with lower power consumption than the main processor, performs networking functions on behalf of the main processor. The processing element monitors events and wakes the main processor when defined criteria are satisfied. In an embodiment, these network functions may be to maintain existing network connections and/or establish new network connections and the defined criteria may relate to messages received by the device which are analyzed by the processing element and these criteria may be configurable by a user of the device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Whilst shutting down or suspending a device reduces the power consumption of a computing device and therefore extends battery life, network connectivity is lost. This means that the device cannot respond to events such as incoming Voice over Internet Protocol (VoIP) calls, instant messenger (IM) messages, emails, the presence of new access points due to mobility, requests for files stored on that device, etc. Additionally the device cannot receive software updates, such as important security patches.

One solution may be to periodically wake the device from the shut down or suspended state to check whether updates or messages are available. However, whilst this enables the device to pull data from entities in the network when awake, the device will not receive any data or messages which are pushed to it when it is shut down/suspended. Periodic wake-up is also inefficient because there may be no updates or messages to download or the device may have moved out of network coverage (e.g. for a wireless mobile device) and therefore the device may be unable to check whether there are any updates or messages to download. Additionally, this may introduce a significant delay in receipt of messages which is particularly problematic for VoIP calls, because the caller will most likely already have stopped waiting for the called user to accept the call. Furthermore, some messages will not be sent (e.g. IM messages) because the user will have disconnected from the IM server and this disconnection state will be published to the user's friends on the IM system.

Figure 1:
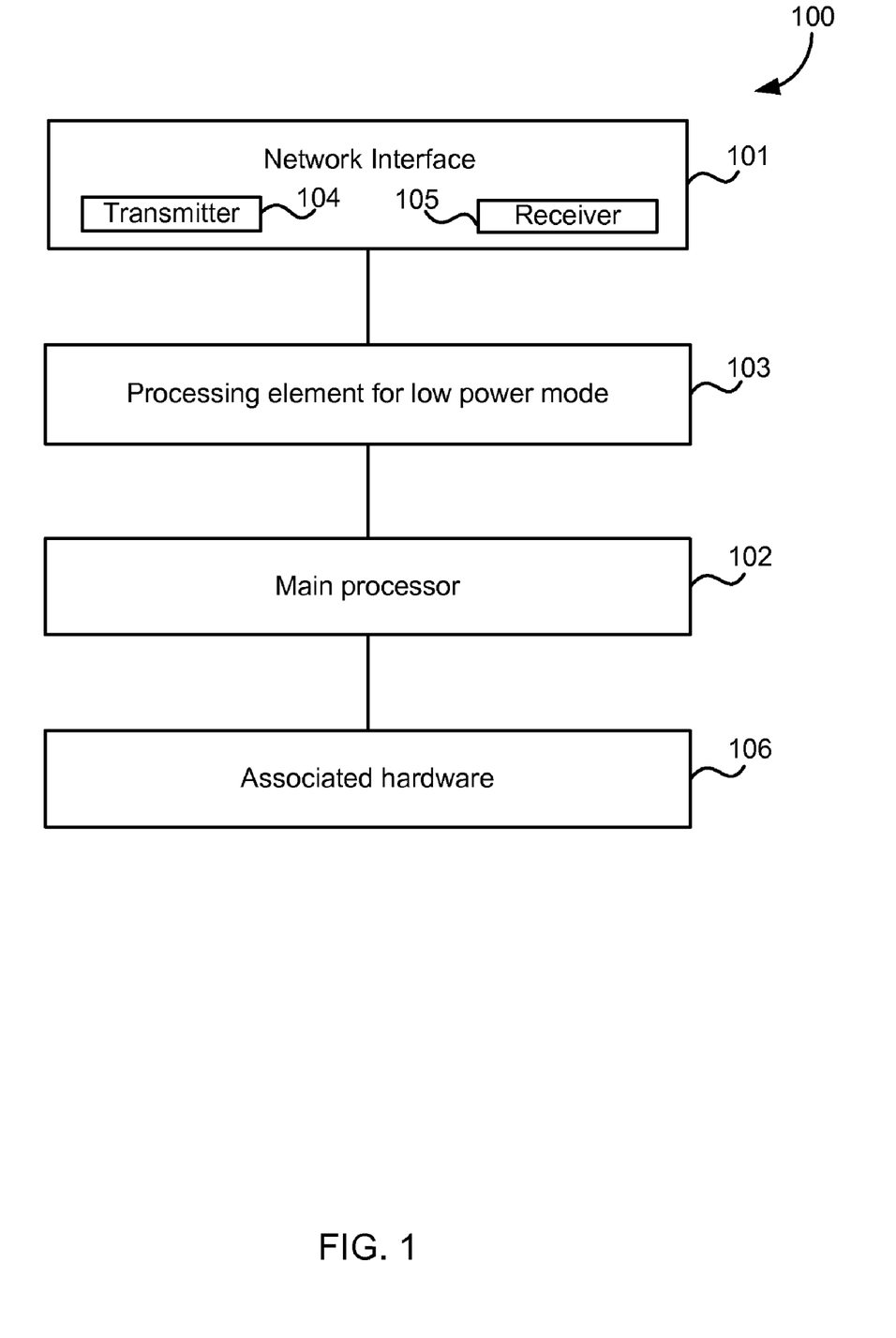
FIG. 1 is a schematic diagram of a networked computing device.

FIG. 1 is a schematic diagram of a networked computing device 100 which has a low power mode in which network connectivity is maintained. The device may wake itself from the low power mode into a higher (or normal) power mode based on pre-configured events signaled by the network interface. In this way it may also be possible for a user to trigger the waking of the device remotely. A user may also be able to trigger the waking of the device using a standard user input device (e.g. button, mouse, keyboard) in a standard manner. The device comprises a network interface 101, a main processor 102 and a processing element 103 with smaller power consumption than the main processor and hardware 106 associated with the main processor 102. The hardware 106 associated with the main processor may comprise a display, hard drives, RAM, graphics interfaces, peripheral devices etc. The processing element 103 is in a different power domain to the main processor (and its associated hardware 106) but may be a part of the main processor 102 (e.g. a separate core on the same physical chip), or a separate processor. It may, in some examples, be part of the network interface 101 (e.g. it may be on the network interface card). The network interface 101 comprises a transmitter 104 and receiver 105 (which may be combined as a transceiver) and is used to connect the computing device 100 to a network, such as the internet, an intranet or a local area network (LAN). The transmitter 104 and receiver 105 may use wireless technology (e.g. WiFi, WiMAX, UWB, cellular wireless technology) or wired technology (e.g. Ethernet) to connect to the network. The computing device 100 may be a single integrated device or a modular device, as shown in the two embodiments described below with reference to FIGS. 4 and 7.

When the device is not operating in the low power mode, the main processor 102 performs all the standard functions of a computing device, such as running applications, maintaining network connectivity, decoding received data packets, authenticating with the network etc. However, in the low power mode, the main processor 102 is switched off or suspended, such that it draws a reduced amount of power. In addition to switching off or suspending the main processor when entering the low power mode, some or all of the associated hardware 106 may also be switched off or suspended. This increases the power savings of using only the processing element 103, which typically does not require as much associated hardware as the main processor 102. The main processor 102 powers down after a defined period of inactivity or as a result of a triggering event (e.g. a user pressing the off/ suspend button or closing a laptop) or the system detecting the absence of a user (for example using motion detection).

The operation of the processing element 103 can be described with reference to FIG. 2. The processing element 103 detects when the main processor 102 is shutting down or entering a suspend mode (block 202). This detection may be performed in any suitable manner, for example by monitoring the power drawn by the main processor 102 or the main processor may send a message to the processing element 103 indicating that it is about to shut down/suspend. In another example, the processing element 103 may monitor the parameters that the main processor uses to determine when to suspend/shut down, e.g. monitoring periods of inactivity or monitoring for triggering events. The techniques described herein may be used whether the main processor shuts down completely or suspends using any available low power mode including S3 (suspend), S4 (hibernate), S5 (hybrid suspend/ hibernate) or other modes designed for energy saving, and therefore for the purposes of the following description, the process of the main processor shutting down or going into any type of low power mode will be referred to as the main processor going to sleep.

On detection that the main processor is going to sleep (in block 202), the processing element enters an active state (block 203) in which it performs networking operations on behalf of the main processor. In performing networking operations on behalf of the main processor (also referred to as being an agent of the main processor) entities in the network are not aware that the main processor has gone to sleep: existing network connections are maintained, new connections may be established (where a connection is lost or did not exist) and/or the ability to establish a new connection may be monitored (as shown in FIG. 3). The networking operations which maintain network connectivity may include generating replies to certain messages (e.g. ICMP pings) and generating periodic messages such as keep-alive messages to maintain an application-layer protocol connection. This functionality is traditionally implemented above the network layer, and run in the main processor.

In its active state, the processing element can send and receive data to/from various other end hosts, including local devices directly reachable through the local network, e.g. wireless access points or other nearby devices using 'ad hoc' connectivity, hosts on networks accessed via those devices e.g. to authenticate to that network for the purpose of establishing Internet access through that network by providing payment credentials, and end hosts on the Internet accessed via such networks. The functionality of the processing element therefore spans the link layer to application layers, as defined in the TCP/IP reference model (and also in the OSI (Open Systems Interconnection) 7-layer model). In order to achieve this, the processing element may support protocols at the link layer such as the 802.11 protocols used to perform wireless networking discovery and association, at the network layer including IP and ICMP, at the transport layer including TCP and UDP, and at the application layer, such as FTP (file transfer protocol), SMTP (simple mail transfer protocol), SIP (session initiation protocol), DNS (domain name service), IMAP (instant message access protocol), POP3 (post office protocol), HTTP (hypertext transfer protocol), remote login using SSH (secure shell), RDP (remote desktop) etc.

The code run by the processing element 103 in its active state (in block 203) can be used to perform a variety of tasks depending on its configuration and depending on the network connection state, as can be described with reference to FIG. 3. One common task may be to maintain the network connectivity of the computing device 100 (whenever there is an available network to connect to) and to enable the main processor to be woken on certain pre-configured events occurring as incoming packets through the maintained network connectivity (block 301 and arrow 31). These events are described in more detail in the examples below. The network connectivity is maintained such that all hosts on the network (including local access routers as well as remote application servers) may be unaware that the device is entering a low power mode and such that any holes in firewalls that are required to enable receipt of external originating communications are maintained. The actions of the processing element may be dependent on the applications which were running on the main processor prior to entering sleep mode and may include 'keep alive' functionality to maintain IP address, maintain authentication with a network, maintain presence in the network, maintain registration with communication servers (such as IM servers, SIP servers or other VoIP servers) etc. This may be achieved by periodically sending messages to elements in the network, or by responding to messages received from elements in the network.

The processing element may also reconnect to the network following a loss of network connection or where there was no network connection when the main processor went to sleep (blocks 302-303). For example if the device is a mobile device it may leave the region of coverage of a first wireless access point (AP) and lose connectivity; the processing element may monitor for coverage of an AP to which it can connect and then connect to that AP. The processing element may further perform authentication with the AP and also with the network that that AP is attached to. This reconnection involves more intelligence than simply monitoring signal strength to determine if the device is in range of an AP, because the processing element determines whether it is appropriate to connect to the AP (block 302; e.g. whether the AP is secured and whether the device has the required authentication details, such as a key, to connect). Furthermore, although the processing element can wake the main processor once a connection is established (if that is the desired configuration), the processing element can also maintain the sleep state and continue to perform actions on behalf of the main processor using the new network, e.g. reestablishing connectivity to servers such as instant messaging or VOIP servers. As shown in FIG. 3, the main processor may, according to the specific configuration, wake the main processor on detection of a connection opportunity (arrow 32), on establishment of a connection (arrow 33) or subsequently based on a particular triggering event (arrow 31).

In order for the processing element to maintain connectivity of the computing device, it may require certain state information from the main processor (block 201). This information may include the current IP address, username and password (or other authentication details such as wireless security keys e.g. WEP (Wireless Equivalency Privacy) or WPA (WiFi Protected Access) keys), details of other wireless or wired access points which the main processor is allowed to use including similar associated authentication or configuration information related to those access points, details of applications which are running on the main processor etc. This state information may be synchronized between the main processor 102 and the processing element 103 prior to the main processor going to sleep. This synchronization may be a single or periodic exchange of data or alternatively, the data may be continuously synchronized whilst the main processor is awake.

Whilst the main processor 102 is asleep, the device 100 may receive a data packet (or several data packets) via the network interface 101. This data packet is received (block 204) and analyzed (block 205) by the processing element 103. The analysis may require decoding of the packet and may cause further outgoing communications (e.g. probing of an email server or an update server). Another function of the analysis is to determine whether defined wakeup criteria are met. Such criteria can be based on any details of received network packets at any layer (including the link layer to application layer). Examples of wakeup criteria include:

- Link layer beacons indicating the presence of particular access points
- The TCP port on which the data is received (as described below with reference to FIG. 8)
- The type of data e.g. IM, VoIP, email etc. For example, the user may configure the wake up only to occur on receipt of a VoIP call and not on receipt of email/IM messages.
- The sender of the data e.g. the sender of the email, the initiator of a VoIP call, the server from which the packet was sent etc. For example, the user may configure the wake up to occur on packets (whether emails, IM messages or VoIP calls) from a particular person only.
- The urgency/priority level of the data e.g. the priority level of an email or of an update. For example, the user may configure the wake up only on the highest priority data.
- The intended recipient of the data. For example, the user may configure the wake up on messages intended for them specifically, rather than on messages sent to distribution lists on which they are included or on broadcast messages.
- The specific IP addresses or specific MAC addresses. For example, the user may configure those IP and/or MAC addresses from which messages would trigger wake up. This may provide increased security.
- Error packets or packets indicating that exceptional conditions have occurred either in the network connection itself or for connections to application servers such as IM servers, which the processing element may not be able to fully handle by itself thus requiring the main processor to wake up to re-establish a well-configured state.

Any combination of these or other criteria may be used to define the wake up criteria and if the defined criteria are met, then wake up is initiated (block 206) to cause the main processor to wake up from shut down/suspend to normal operating mode. Depending on implementation, the wake up may be initiated using interrupt lines (e.g. which may be raised to initiate wake up), using the ring indicator on a virtual COM port, by spoofing a keyboard or other device with wake up capabilities, by mimicking the pressing of a physical power button such as the user might normally press to cause the main processor to wake from suspend, or using any mechanism which supports event-based wake up.

Depending upon the communication protocol used in the network connection, the data packet received (in block 205) may be discarded or may be transferred to the main processor (e.g. through insertion into the receive stack). In particular, one optimization to reduce the complexity of the integration between the main processor and the processing element is as follows: where the protocol of the data packet which causes wake-up uses re-transmission (e.g. TCP/IP), that data packet may be discarded instead of transferred to the main processor safely, since the data packet will be re-transmitted and such retransmission will be received by the main processor once it has woken up. Depending on the delay in waking of the main processor, this discarding of the received packet may introduce further delay as re-transmission occurs with increasing time intervals between attempts. In some embodiments, or for some data packets, it may be beneficial not to discard the packet but to forward it to the main processor on wake up.

In some implementations, state may be transferred to the main processor from the processing element on wake up (block 207). This state information may include the IP address, session keys, details of currently associated APs (so that it is not necessary to scan for WiFi APs again) and other parameters which may reduce the time between when the device wakes and when its networking functionality becomes available. Currently when a main processor comes out of a sleep state, it typically resets and re-initializes elements of its associated hardware such as network interfaces, and then uses the hardware to scan the network and perform the various stages of network association and configuration. After that has happened, applications typically re-initialize their connections to remote servers such as VOIP servers. Use of state information provided to the main processor by the processing element may eliminate the need for some or all of the re-initialization processes by the operating system (OS) and/or application levels. The OS and/or applications run on the main processor may be modified to take advantage of this state information provided on wake up and reduce the time from the wake up event to being ready for use by a user. Alternatively, the system can function using current, unmodified operating systems and while the advantages of state information transfer is not achieved, the reduction in complexity of deployment due to the use of an unchanged operating system may be more beneficial in some cases.

Figure 2:
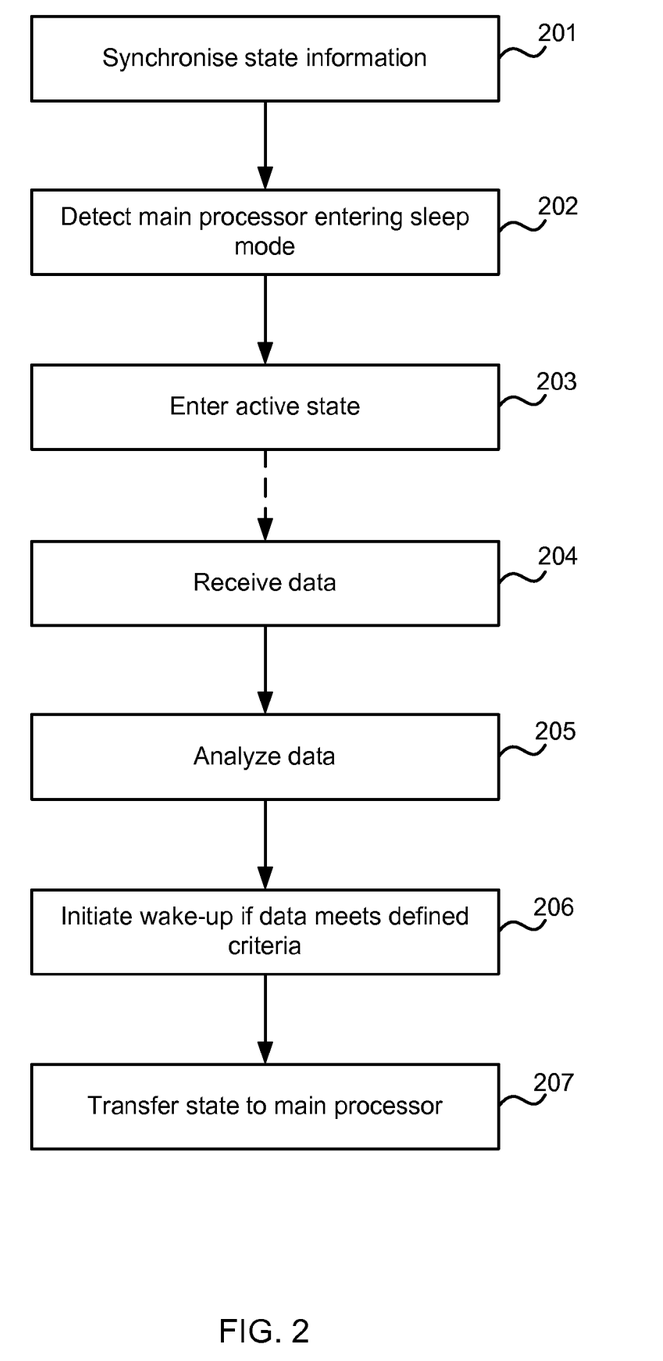
FIG. 2 is a flow diagram of an example method of operation of the processing element within the device of FIG. 1.
Figure 3:
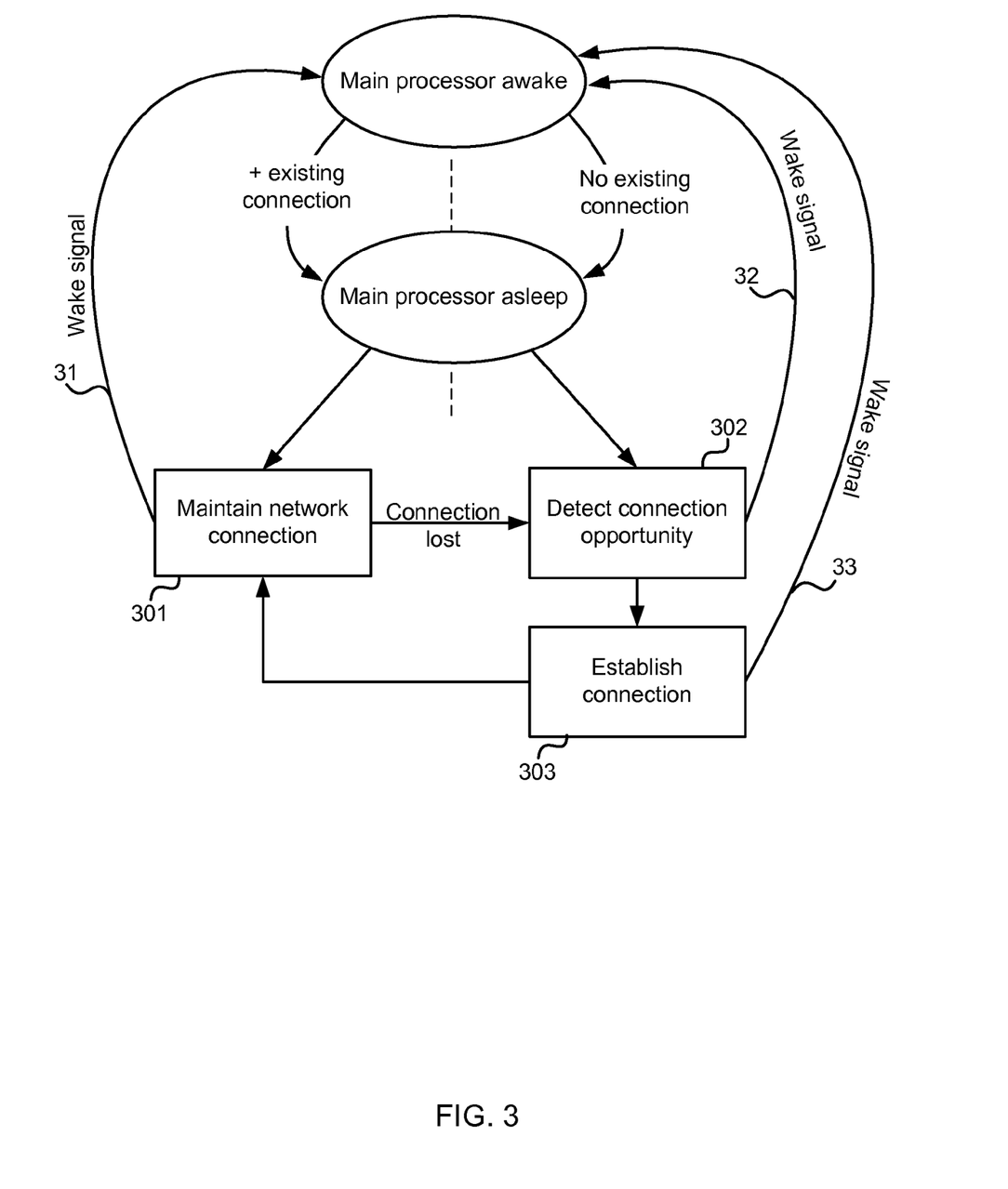
FIG. 3 is a flow diagram showing the operation of the processing element in its active state.

In addition to triggering wake up when a received data packet meets defined criteria (as shown in FIG. 2), the processing element may trigger wake up based on other events. For example, the processing element may periodically probe network elements (e.g. update servers to determine if updates are available) and then initiate wake up of the main processor if defined criteria are satisfied. In such an example, the operation of the processing element is as shown in FIG. 2 with blocks 205 and 206 omitted (or as in FIG. 5 described below with blocks 505 and 506 omitted).

The software code run by the processing element 103 which is used to perform the network functionality on behalf of the main processor 102 (as described above) may be stored in memory associated with the processing element (not shown in FIG. 1). In another example implementation, the software code and the processing element may be implemented in firmware.

Through use of a processing element 103 which remains in an active state whilst the main processor is asleep, as described above, the computing device 100 can reduce its power consumption, whilst maintaining full network connectivity. This means that if a VoIP call is received by the computing device, the main processor can be woken up and the call taken by the user of the computing device. Similarly, emails and IM messages may be received as soon as they arrive without significant delay. A user can also connect to a remote machine, where the main processor is switched off or suspended, to retrieve a file. Updates may also be performed automatically because the processing element can monitor for updates being available and when they are can wake the main processor to initiate the download and installation of the update. Depending on the memory associated with the processing element, the processing element may be able to download the update without waking the main processor and then once downloaded, may wake the main processor to install the update.

The reduction of power consumption is particularly beneficial for mobile devices which are battery operated. Reduced power consumption can lead to increased lifetimes between charging and/or reduce the size, cost and weight of the battery. However, reduction of power consumption is also beneficial for mains powered devices (which may or may not be mobile devices) because this leads to reduced energy bills (and hence reduced operating costs) and is more environmentally friendly.

The software code run on the processing element which is used to maintain/establish network connectivity may be generated in a number of different ways. In a first example, it may comprise fragments (or threads) of code written for common protocols and depending on the particular application and protocol this code may comprise application layer code or may span any or all of the link to application layers. For example, keep alive code may be written for SIP and for IM and these code fragments may always be run or may be run dependent on the applications running on the main processor prior to it going to sleep. In a second example, a compiler may be modified to provide code designed to run on the processing element as an additional output when an application is compiled. In a third example, the device (or a server) may run a learning algorithm which monitors the applications run on the main processor and generates keep alive code which may then be run on the processing element.

The software code which is run on the processing element may be generated within the computing device 100 or may be generated centrally and distributed to devices across the network in a similar manner to virus definitions. For example, a central server may hold the required keep alive code for various commonly used applications or protocols. This code may be downloaded by the computing device and stored in memory on the device.

Figure 4:
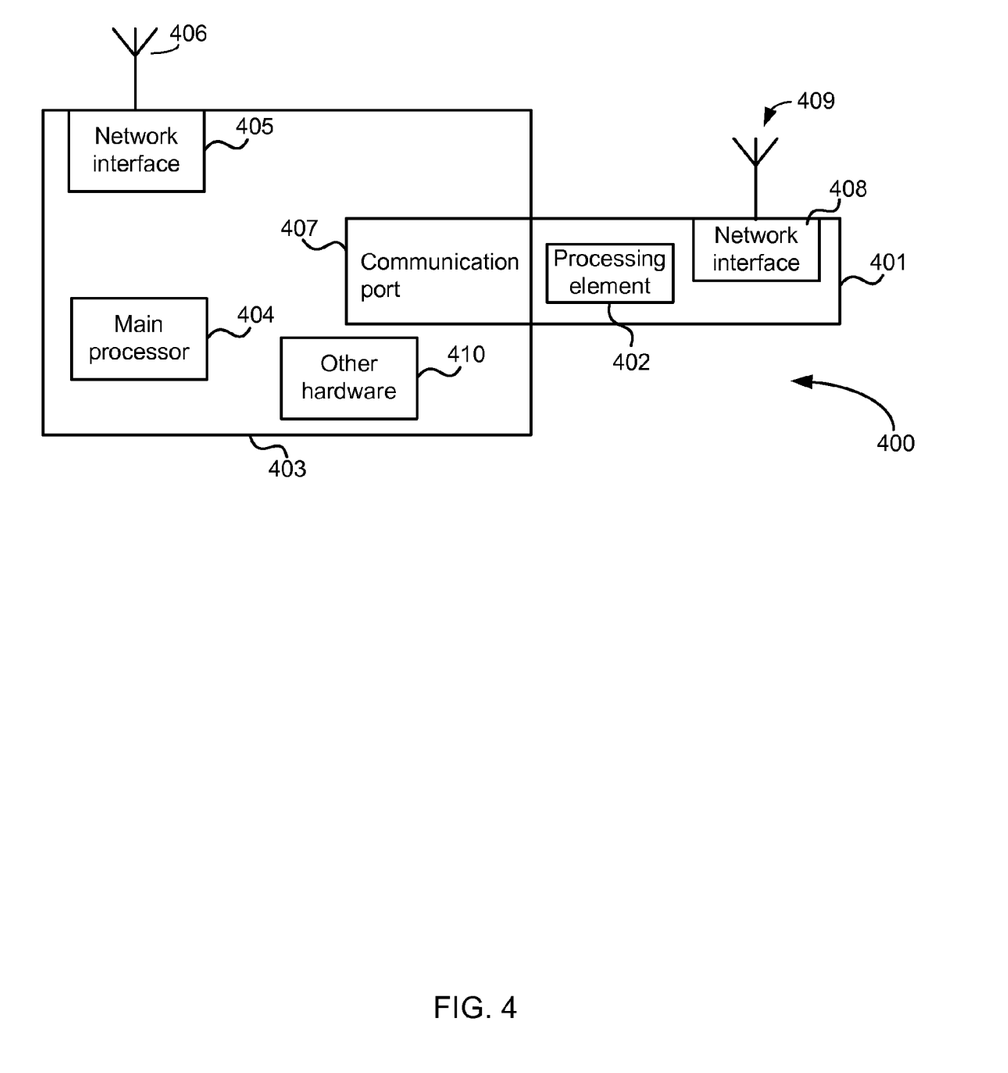
FIG. 4 is a schematic diagram of a second networked computing device.

FIG. 4 is a schematic diagram of a computing device 400 in which the processing element 402 is implemented on a hardware dongle (or key) 401. Such a hardware dongle implementation enables the low power method to be implemented on many devices and retrofitted to existing devices. The main device 403 comprises a main processor 404, a network interface 405 and a communication port 407 (e.g. a USB port). The main device also comprises other hardware 410 (which is associated with the main processor 404), which may comprise a display, a hard drive, a graphics interface etc. Whilst the network interface is shown as a wireless network interface (with antenna 406), this is by way of example only and wired technology may alternatively be used. The hardware dongle 401, which connects to the communication port 407 on the main device, comprises the processing element 402 and a second network interface 408. This second network interface uses the same network protocol and technology as the network interface 405 of the main device 403 (i.e. wireless in this example, as indicated by antenna 409).

In the computing device 400 of FIG. 4, the hardware dongle runs the software code to maintain network connectivity whilst the main device is shut down or suspended. The main device runs a device driver for the hardware dongle. The hardware dongle may be powered by the main device via the communication port whilst the main device is suspended. The hardware dongle may also comprise a battery (not shown in FIG. 4) which may be charged whilst power is available from the main device. If the main device is shut down (rather than suspended) power may not be available. In such a situation, the hardware dongle may operate using its local battery power for as long as possible, but then wake up the main device (either fully or into suspend mode) when the battery in the hardware dongle begins to become discharged.

The operation of the processing element 402 on the hardware dongle 401 can be described with reference to the flow diagram of FIG. 5. Before the main device 403 shuts down or goes into suspend mode, the MAC address of the network interface 405 on the main device is transferred to the hardware dongle along with the IP address currently being used (block 501). Additional information, such as authentication information, may also be transferred. On detection of the main device going to sleep (block 502), the wireless network interface on the dongle is switched on (block 503) and the processing element 402 enters an active (block 504). The processing element continues communication with the AP with which the main device was communicating in order to maintain the connectivity and the wireless network interface 408 on the hardware dongle 401 uses the same MAC address as previously used by the network interface 405 on the main device 403, so that the network is unaware of the switch to a different network interface (i.e. the handover from the main processor to the processing element is transparent). As the same MAC address is used, this system is compatible with security schemes which use MAC address filtering. If connectivity is lost, the software code causes the network interface to reconnect to the AP and may re-associate with the network so that the IP address is maintained. On subsequent receipt of a data packet (block 505) over the wireless interface, the data packet is analyzed (block 506) and dependent upon this analysis, the processing element may initiate wake up of the main device (block 507). The wake up of the main device may, for example, be triggered using the ring indicator on a virtual COM port or by spoofing a a key press on a keyboard. Having initiated the wake up, the network interface on the hardware dongle is switched off (block 508).

As described above, the processing element manages the network interface on the hardware dongle to ensure that in the whole device 400, either one or no network interface is active at any time, thus avoiding errors that typically occur in networks where there are more than one device using the same MAC or IP address.

Figure 5:
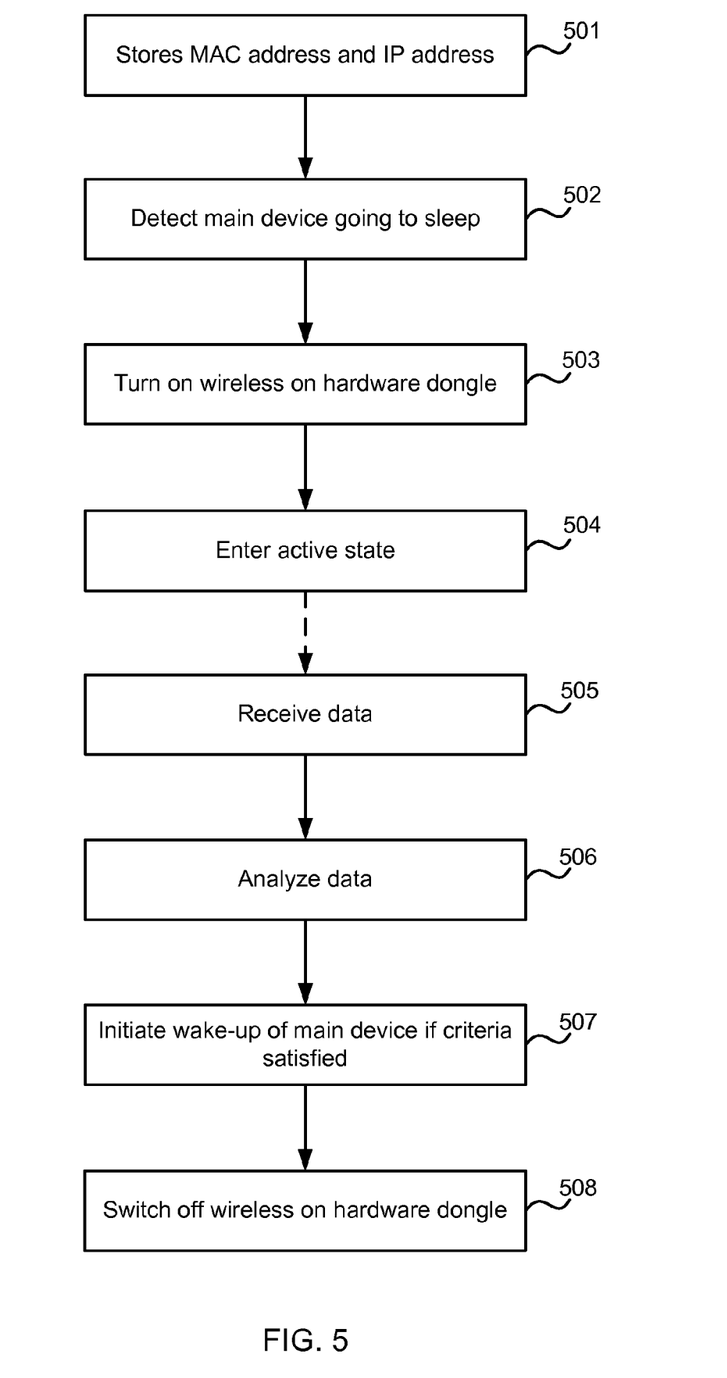
FIG. 5 is a flow diagram of an example method of operation of the processing element within the device of FIG. 4.

In the flow diagram of FIG. 5, no state is transferred back to the main device on wake up. However, in some examples, state may be transferred (e.g. IP address where the IP address has changed, AP MAC address and channel information, thus not requiring a full scan for APs). Additionally, although in FIG. 5 the MAC address is shown being transferred from the network interface 405 on the main device to the network interface 408 on the hardware dongle, in another example, the MAC address may be transferred in the other direction, such that the network interface on the main device uses the MAC address of the network interface on the hardware dongle. In this example, the transfer of the MAC address to the main device may be managed by the device driver for the hardware dongle or the operating system of the main device may be modified to integrate this functionality.

Whilst in FIG. 4, the main device 403 and the hardware dongle 401 are shown as comprising a network interface with only one active at a time, thus mimicking a single network interface, in another example the hardware dongle 401 can provide a network interface that is active at all times (other than when the system as a whole is completely powered down). When the main device 403 is awake, the hardware dongle 401 acts as a normal network interface peripheral through which the main device conducts networking operations, and the processing element 402 is in an idle state (or otherwise assists with the dongle's functionality as a network interface peripheral). When the main device 403 enters a sleep state, the hardware dongle 401 stays awake and the processing element 402 enters the active state perform networking functions on the main device's behalf.

In a further example, the network interfaces on the main device and the hardware dongle may use different technologies; for example the main device may include a wired network interface (e.g. Ethernet) and the hardware dongle may include a wireless network interface (e.g. WiFi). In such an example, the network connectivity is maintained over the network interface on the hardware dongle and the wake up is initiated as a result of a data packet received over that same network interface on the hardware dongle. Subsequent communication with the network may occur using either of the network interfaces and as described above it may be necessary to transfer state between network interfaces. Whilst only one network interface remains on during the low power mode (i.e. the interface which is controlled by the processing element), on wake up additional network interfaces may be powered up in addition to powering up the main processor.

Whilst the hardware dongle 401 of FIG. 4 is shown connecting to a single communication port 407, in other examples the hardware dongle may connect to more than one communication port. The additional communication port may be used to separate out communication and the provision of power, or to provide an additional port for debugging.

Figure 6:
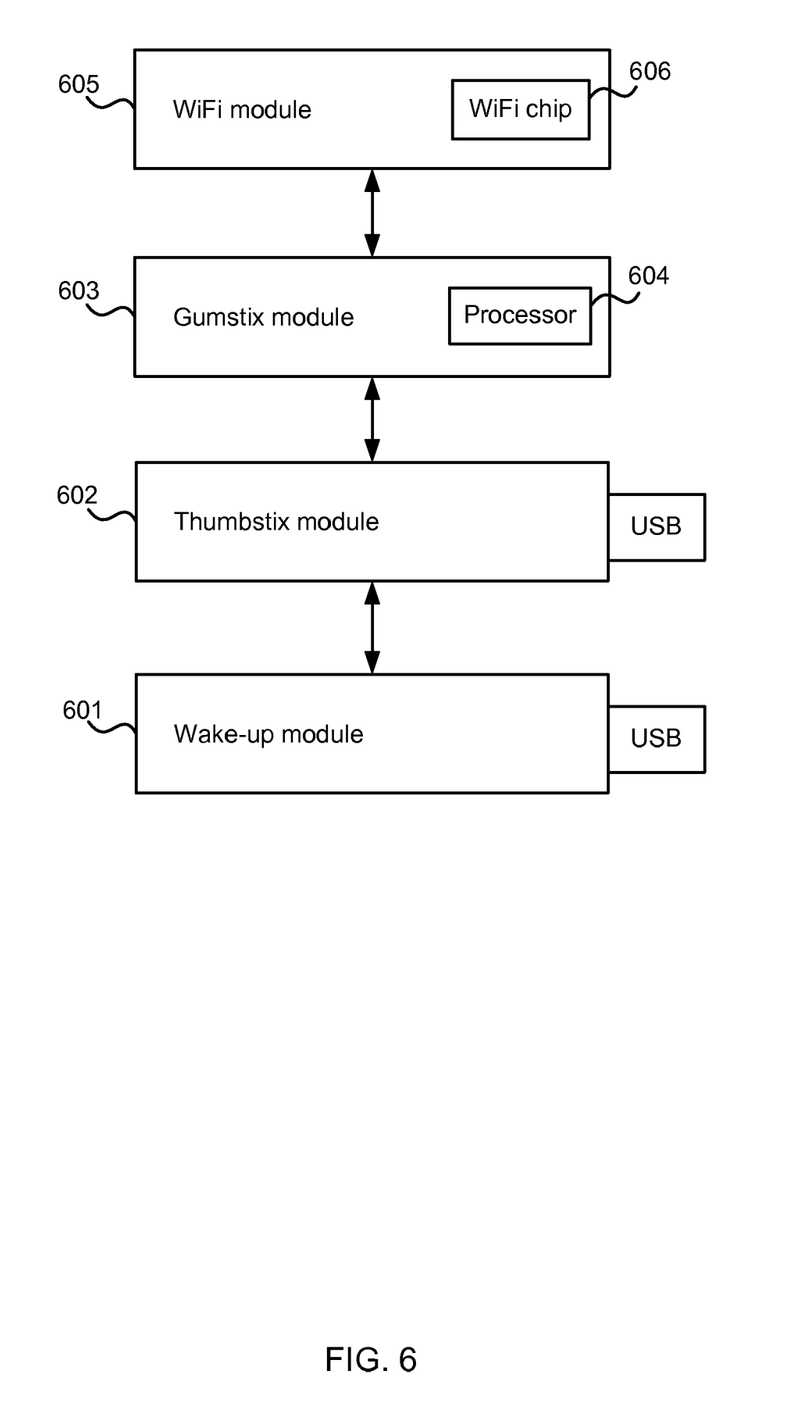
FIG. 6 shows a schematic diagram of an example implementation of a hardware dongle.

FIG. 6 shows a schematic diagram of an example implementation of the hardware dongle using modules from Gumstix Inc. This implementation uses two USB ports to connect to the main device. The first USB port connects to a wake up module 601 and is used for debug and for initiating the wake up signal using the ring indicator on the USB port. The second USB port connects to a Thumbstix module 602 and is used to provide power and communication using Ethernet over USB (e.g. for transfer of MAC and IP addresses). Connected to the Thumbstix module are a Gumstix™ module 603 which includes a processor 604 and a WiFi module 605 which includes a WiFi chip 606. The processor 604 is the processing element (as described above) and the WiFi module 605 is the network interface (as described above).

Although the example of FIG. 6 shows a separate WiFi chip 606 and processor 604, in another embodiment, where the WiFi chip includes a microcontroller, the processing element may be integrated into the network interface.

Figure 7:
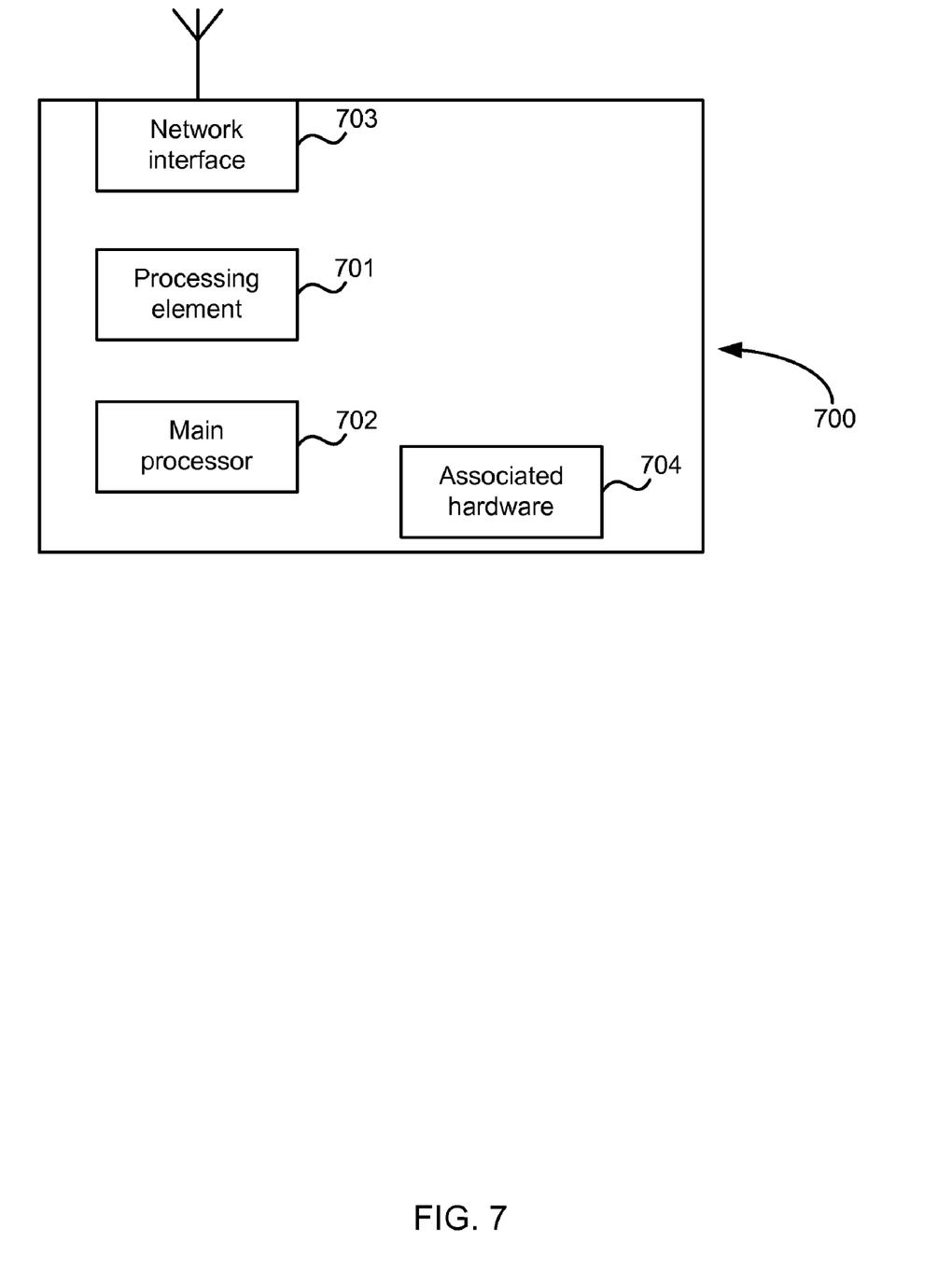
FIG. 7 is a schematic diagram of another networked computing device.

FIG. 7 is a schematic diagram of a computing device 700 with an integrated processing element 701. The processing element may be implemented as a separate processor, which may be located on the network interface card or elsewhere (e.g. on the motherboard). Alternatively, the processing element may be part of the main processor 702, e.g. as a separate core on the main processor. In this example there is only one network interface 703 which is involved in the wake up process, although there may be other network interfaces within the device (not shown in FIG. 7). The computing device 700 also comprises hardware 704 associated with the main processor 702, such as a hard drive, a display etc.

Figure 8:
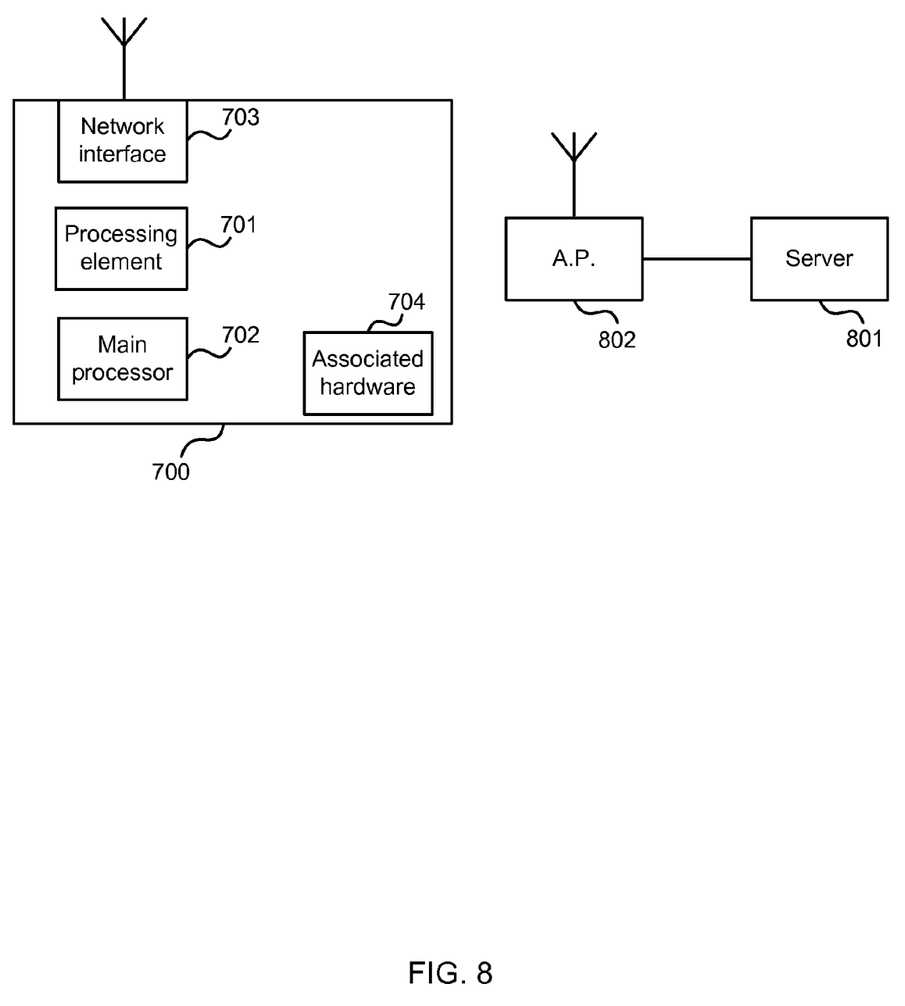
FIG. 8 is a schematic diagram showing an example application of the device of FIG. 7.

An example application can be described with reference to FIG. 8 which shows a computing device 700 (e.g. as shown in FIG. 7), a VoIP server 801 and an access point 802. The VoIP server 801 maps an incoming call to a particular user of the computing device 700 to the current IP address of the computing device. The main processor of the computing device may be asleep, but the IP address is maintained by the operations of the processing element. The processing element is configured to wake the main processor on receipt of a packet on a particular identified port. When an incoming call is received at the VoIP server, a TCP/IP SYN message is sent to the computing device via the AP. The SYN message is received on the particular port and on detection of this, the processing element initiates wake up of the main processor and discards the SYN message. As the SYN message has not been acknowledged, the VoIP server re-transmits the message periodically. Once the main processor is awake, it receives the next re-transmitted SYN message, sends an acknowledgement message and the connection is established. Upon completion of the VoIP call, the main processor may return to sleep state.

As the network interface remains powered at all times and the network connectivity is maintained by the processing element which remains in an active state whilst the main processor is asleep, even if the device is mobile, the delay in wake up is minimized, which may be beneficial for real-time communication methods such as VoIP calls. On wake up there is no requirement to scan for available APs and to register with the network which would otherwise introduce a significant delay.

A second example application is remote wake up of a computer (e.g. using Remote Desktop Protocol (RDP)), which may also be described with reference to FIG. 8. This may be to enable updates to be performed or to enable a user to leave their computing device in a low power mode but still be able to wake it up to access files or other data stored on the device. A network server 801 (such as a DNS server or Dynamic DNS server) maps an RDP request to the computing device 700 to the current IP address of the computing device. The main processor of the computing device may be asleep, but the IP address is maintained by the operations of the processing element. The processing element is configured to wake the main processor on receipt of a packet on port 3389. When an incoming RDP request is received at the server, a TCP/IP SYN message is sent to the computing device via the AP. The SYN message is received on port 3389 and on detection of this, the processing element initiates wake up of the main processor and discards the SYN message. As the SYN message has not been acknowledged, the server re-transmits the message periodically. Once the main processor is awake, it receives the next re-transmitted SYN message, sends an acknowledgement message and the connection is established. Upon completion of file transfer, the main processor may return to sleep state.

In a further example application, the processing element may be used to connect to a network automatically whilst the device is asleep, in addition to (or instead of) maintaining connectivity where it exists before the main processor goes to sleep (as shown in FIG. 3). In such a scenario, a user may write an email on a train where there is no wireless AP and may then shut down their machine or put it into a suspend state. The processing element (running the application layer code) monitors for available APs and on discovering a suitable AP which it can connect to (block 302), it may connect to that AP (block 303). The processing element may then initiate wake up of the main processor in order that the email can be sent (arrow 33), or alternatively, depending on the functionality of the application layer code, the processing element may be able to send the email without needing to wake the main processor.

FIGS. 1, 4 and 7 illustrate various components of exemplary computing-based devices 100, 400, 700 which may be implemented as any form of a computing and/or electronic device, and in which embodiments of the power management techniques described herein may be implemented. The main processors 102, 404, 702 and processing elements 103, 402, 701 may be microprocessors, controllers or any other suitable type of processors for processing computing executable instructions to control the operation of the device. The computer executable instructions may be provided using any computer-readable media, such as memory (which may be included within the associated hardware 106, 410, 704). The memory may be of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system or any other suitable platform software may be provided at the computing-based device (e.g. stored in memory) to enable application software to be executed on the device.

The computing-based devices 100, 400, 700 may further comprise one or more inputs of any suitable type for receiving media content, Internet Protocol (IP) input etc and one or more outputs, such as an audio and/or video output to a display system integral with or in communication with the computing-based device. The display system may provide a graphical user interface (GUI), such as the GUI used to configure the events on which the processing element wakes the main processor (described below). The associated hardware 106, 410, 704 shown in FIGS. 1, 4 and 7 may comprise the inputs, outputs, display system etc.

The devices 100, 400, 700 described above may be mobile devices, such as laptops, PDAs, mobile telephones etc, or may be non-mobile devices, such as desktop computers, servers etc.

As described above, the events on which the wake up occurs may be user configured. A GUI may be provided to the user to enable the configuration of the events. As the processing element runs code which may span any of the link to application layers (rather than code which can only function at the lower layers: link, network and transport layers), the processing element can decode and analyze any data packets which are received and wake up can be triggered based on higher level events. The processing element can determine the packet type, the sender of any data, any priority/urgency rating etc. A user may therefore be able to define which other users' communications trigger wake up and/or which types of communication (e.g. email, IM, VoIP call) trigger wake up.

The use of higher layer intelligence (i.e. spanning any of the link to application layers as required) also increases the robustness of the devices against denial of service attacks, because unless the specific criteria are satisfied, the main processor will not be woken up (rather than being woken on receipt of any packet).

Whilst the above examples do not require any kind of special data packets sent by the network in order to initiate wake up of the main processor, in some examples, there may also be use of special packets which cause particular behavior on the receiving device. Where mobile devices are used to store sensitive data (e.g. personal data or commercially sensitive data), it may be beneficial to stop the data being available if a device is stolen. In such a scenario, a special packet may be sent to the device which causes the application layer code run on the processing element to wipe data stored on the device, even if the main processor is shut down or suspended. This may be user configured and then sent by the network on notification that the device has been stolen.

In the above examples the power saving methods implemented on the computing devices 100, 400, 700 are transparent to the network such that network entities are not aware that the main processor has gone to sleep and there are no changes required to the network; however, in some embodiments the network may also be modified. For example, elements in the network may be used to distribute the particular application layer threads which are run on the processing element (as described above).

In addition to wake up based on data packets received, the processing element may also be configured to wake the main processor on detection of other events. For example, the processing element may also receive signals from sensors in the computing device or external to the sensing device (e.g. PIR (passive infra-red), GPS (global positioning system), temperature sensors etc).

Although the present examples are described and illustrated herein as being implemented in a wireless system, the system described is provided as an example and not a limitation. As those skilled in the art will appreciate, the present examples are suitable for application in a variety of different types of wired or wireless systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computing device comprising:
    a network interface device;
    a processing element; and
    an output to a main processor,
    wherein the processing element is arranged to:
    perform networking operations on behalf of the main processor when the main processor is powered down;
    send a wake up signal to the main processor via the output when defined criteria are satisfied; and
    provide state information to the main processor on wake up.

2. A computing device according to claim 1, wherein the networking operations comprise at least one of:
    maintaining network connectivity on behalf of the main processor;
    establishing a network connection on behalf of the main processor; and
    detecting a connection opportunity on behalf of the main processor.

3. A computing device according to claim 1, wherein the processing element is further arranged to:
    analyze data received via the network interface when the main processor is powered down; and
    wherein the wake up signal is sent when the received data satisfies defined criteria.

4. A computing device according to claim 3, wherein the processing element is arranged to maintain network connectivity by periodically sending messages to elements in a network via the network interface and responding to defined messages.

5. A computing device according to claim 1, wherein the processing element is further arranged to:
    obtain state information from the main processor prior to the main processor powering down.

6. A computing device according to claim 5, further comprising a second network interface, wherein the state information comprises a MAC address and an IP address of the second network interface and wherein the processing element is further arranged to:
    switch on the network interface device on detection of powering down of the main device; and
    switch off the network interface device after sending the wake up signal.

7. A computing device according to claim 5, wherein the network interface device is arranged to:
    operate under control of the processing element when the main processor is powered down; and
    operate under the control of the main processor when the main processor is not powered down.

8. A computing device according to claim 1, wherein the processing element is further arranged to:
    provide state information to the main processor on wake up.

9. A computing device according to claim 1, further comprising the main processor and wherein the main processor is arranged on wake up to initialize the device using the state information provided by the processing element.

10. A computing device according to claim 9, wherein the main processor is in a separate power domain to the processing element and wherein the main processor has a higher power consumption than the processing element.

11. A computing device according to claim 1, wherein the processing element is further arranged to:
    detect when the main processor powers down.

12. One or more computer-readable memory to store executable instructions that, when are executed by one or more processors, configure the one or more processors to implement acts comprising:
    detecting a main processor in a computing device powering down, the computing device including a network interface device;
    using a lower power processor to perform networking operations on behalf of the main processor;
    waking the main processor when defined criteria are satisfied; and
    providing state information to the main processor on wake up.

13. The one or more computer-readable memory according to claim 12, wherein the networking operations comprise at least one of:
    maintaining network connectivity on behalf of the main processor;
    establishing a network connection on behalf of the main processor; or
    detecting a connection opportunity on behalf of the main processor.

14. The one or more computer-readable memory according to claim 12, further comprising:
    analyzing data received; and
    sending a wake up signal to the main processor when the data received satisfies the defined criteria.

15. The one or more computer-readable memory according to claim 12, wherein network connectivity is maintained by periodically sending messages to network elements and by responding to defined messages.

16. The one or more computer-readable memory according to claim 12, further comprising:
    transferring state information between the main processor and the processing element.

17. A power control system comprising a first and a second power domain, wherein the first power domain comprises a first processor and associated hardware and wherein the second power domain comprises:
   a network interface device;
   a second processor; and
   a memory storing executable instructions arranged to cause the second processor to:
      obtain state information from the first processor on the first power domain;
      detect when the first power domain enters a sleep state from an operating state;
      maintain network connectivity;
      cause the first power domain to return to the operating state when defined criteria are satisfied; and
      provide state information to the first processor on wake up.

18. A power control system according to claim 17, wherein the memory is further arranged to store executable instructions arranged to cause the second processor to:
   analyze data received via the network interface when the first power domain is in the sleep state; and
   send a signal to the first processor to cause the first power domain to return to the operating state when the received data satisfies the defined criteria.

19. A power control system according to claim 17, wherein the executable instructions arranged to cause the second processor to use application layer protocols to maintain network connectivity comprise executable instructions arranged to cause the second processor to:
   periodically send messages to elements in a network to maintain connectivity.

* * * * *